(12) United States Patent
Fast et al.

(10) Patent No.: US 9,772,026 B2
(45) Date of Patent: Sep. 26, 2017

(54) DIFFERENTIAL AND DIFFERENTIAL LUBRICATING FLUID MANAGEMENT SYSTEM

(71) Applicant: FORD GLOBAL TECHNOLOGIES, LLC, Dearborn, MI (US)

(72) Inventors: Mathew John Fast, Dearborn Heights, MI (US); Danrich Henry Demitroff, Okemos, MI (US); Sunil Katragadda, Canton, MI (US); Lawrence Marshall, St. Clair Shores, MI (US); W. Cary Cole, Livonia, MI (US); Michael Levin, Ann Arbor, MI (US); Furqan Zafar Shaikh, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 115 days.

(21) Appl. No.: 14/747,565

(22) Filed: Jun. 23, 2015

(65) Prior Publication Data

US 2016/0377164 A1    Dec. 29, 2016

(51) Int. Cl.
*F16H 48/08* (2006.01)
*F16H 57/04* (2010.01)

(52) U.S. Cl.
CPC ..... *F16H 57/0423* (2013.01); *F16H 57/0457* (2013.01); *F16H 57/0471* (2013.01); *F16H 57/0479* (2013.01); *F16H 57/0483* (2013.01); *F16H 48/08* (2013.01)

(58) Field of Classification Search
None
See application file for complete search history.

(56) References Cited

U.S. PATENT DOCUMENTS

| | | | |
|---|---|---|---|
| 5,709,135 A * | 1/1998 | Baxter | B60K 17/20 475/160 |
| 6,135,241 A | 10/2000 | Ganguly et al. | |
| 6,299,561 B1 | 10/2001 | Kramer et al. | |
| 7,878,304 B2 | 2/2011 | Reis et al. | |
| 8,657,073 B2 | 2/2014 | Matsumoto et al. | |
| 8,746,405 B2 | 6/2014 | Perakes et al. | |
| 9,316,256 B2 * | 4/2016 | Murakami | F16C 33/6674 |
| 2006/0245678 A1 * | 11/2006 | Chiba | F16C 19/364 384/571 |
| 2011/0000332 A1 | 1/2011 | Gianone et al. | |

(Continued)

FOREIGN PATENT DOCUMENTS

| | | | |
|---|---|---|---|
| DE | 102011109393 A1 * | 2/2013 | F16H 57/0409 |
| WO | WO20140165474 A1 * | 10/2014 | B60K 17/16 |

OTHER PUBLICATIONS

Niebauer et al, Axle gear for motor car, has shielidng element with surface, Feb. 7, 2013, Machine Translation of DE102011109393. Espacenet.*

*Primary Examiner* — Ramya Burgess
*Assistant Examiner* — Lori Wu
(74) *Attorney, Agent, or Firm* — James Dottavio; Brooks Kushman P.C.

(57) ABSTRACT

A differential is provided. The differential includes a housing that has a sump, an input shaft, a ring gear, a carrier that is affixed to the ring gear, and a diverter. The sump is configured to collect lubricating fluid. The ring gear is configured to transfer lubricating fluid out of the sump. The diverter is configured to direct the lubricating fluid to the input shaft and carrier.

18 Claims, 4 Drawing Sheets

(56) References Cited

U.S. PATENT DOCUMENTS

2014/0260790 A1*  9/2014  Passino .............. F16H 57/0409
                                                  74/606 R
2015/0219204 A1*  8/2015  Kruger ................ F16H 57/0409
                                                  184/6.12

* cited by examiner

US 9,772,026 B2

DIFFERENTIAL AND DIFFERENTIAL LUBRICATING FLUID MANAGEMENT SYSTEM

TECHNICAL FIELD

The present disclosure relates to differentials and a system for managing lubricating fluid in a differential.

BACKGROUND

Automotive driveline systems may utilize differentials for torque multiplication and/or power flow purposes. The internal gearing may be used to splash lubricating fluid located within the housing of the differential to lubricate the various internal components of the differential.

SUMMARY

A differential is provided. The differential includes a housing that has a sump, a ring gear, a carrier that is affixed to the ring gear, and a diverter. The sump is configured to collect lubricating fluid. The ring gear is configured to transfer lubricating fluid out of the sump. The diverter is configured to direct the lubricating fluid transferred by the ring gear to the carrier. The differential may also include an input shaft, and the diverter may also be configured to direct the lubricating fluid transferred by the ring gear to the input shaft and bearings that support the input shaft. The carrier may support at least one planet gear that meshes with output gears, and the diverter may be further configured to direct the lubricating fluid transferred by the ring gear to the at least one planet gear and output gears.

A differential lubricating fluid diverter is provided. The diverter includes an outer wall that is secured to a differential housing. The outer wall of the diverter surrounds a portion of a periphery of a ring gear. The ring gear is configured to transfer lubricating fluid out of a sump. The diverter may also include a first side wall and a second side wall. The first side wall may extend from the outer wall and enclose a portion of a first side of the ring gear. The second side wall may extend from the outer wall and enclose a portion of a second side of the ring gear. The diverter is configured to direct the lubricating fluid transferred by the ring gear to a carrier that is affixed to the ring gear. The diverter may also be configured to direct the lubricating fluid transferred by the ring gear to an input shaft and bearings that support the input shaft. The diverter may be further configured to direct the lubricating fluid transferred by the ring gear to at least one planet gear supported by the carrier and output gears that mesh with the at least one planet gear.

A differential lubricating fluid diverter is provided. The diverter includes an upper portion that encloses a top portion of a ring gear and a lower portion that encloses a bottom portion of the ring gear. The diverter may also include a middle portion that encloses a center portion of the ring gear and connects the upper portion of the diverter to the lower portion of the diverter. Lubricating fluid may flow from a sump to the lower portion of the diverter through a flow rate restricting orifice. The ring gear may be configured to transfer the lubricating fluid out of the lower portion of the diverter. The upper portion of the diverter may be configured to direct the lubricating fluid to an input shaft and a carrier that is affixed to the ring gear. The diverter may also be configured to direct the lubricating fluid transferred by the ring gear to an input shaft and bearings that support the input shaft. The diverter may be further configured to direct the lubricating fluid transferred by the ring gear to at least one planet gear supported by the carrier and output gears that mesh with the at least one planet gear.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
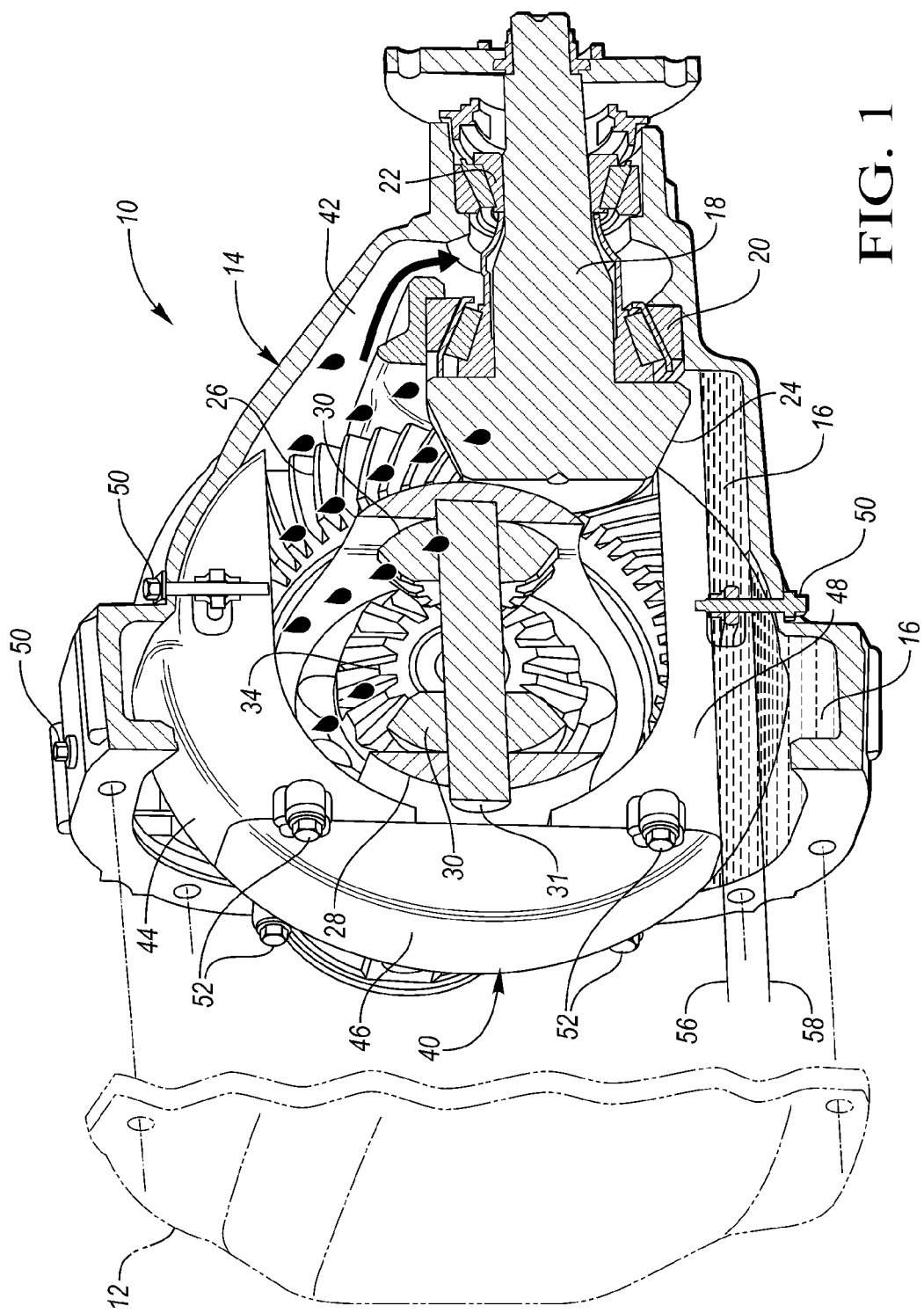
FIG. 1 is a cross-sectional side view of a differential with the differential housing cover removed.
Figure 2:
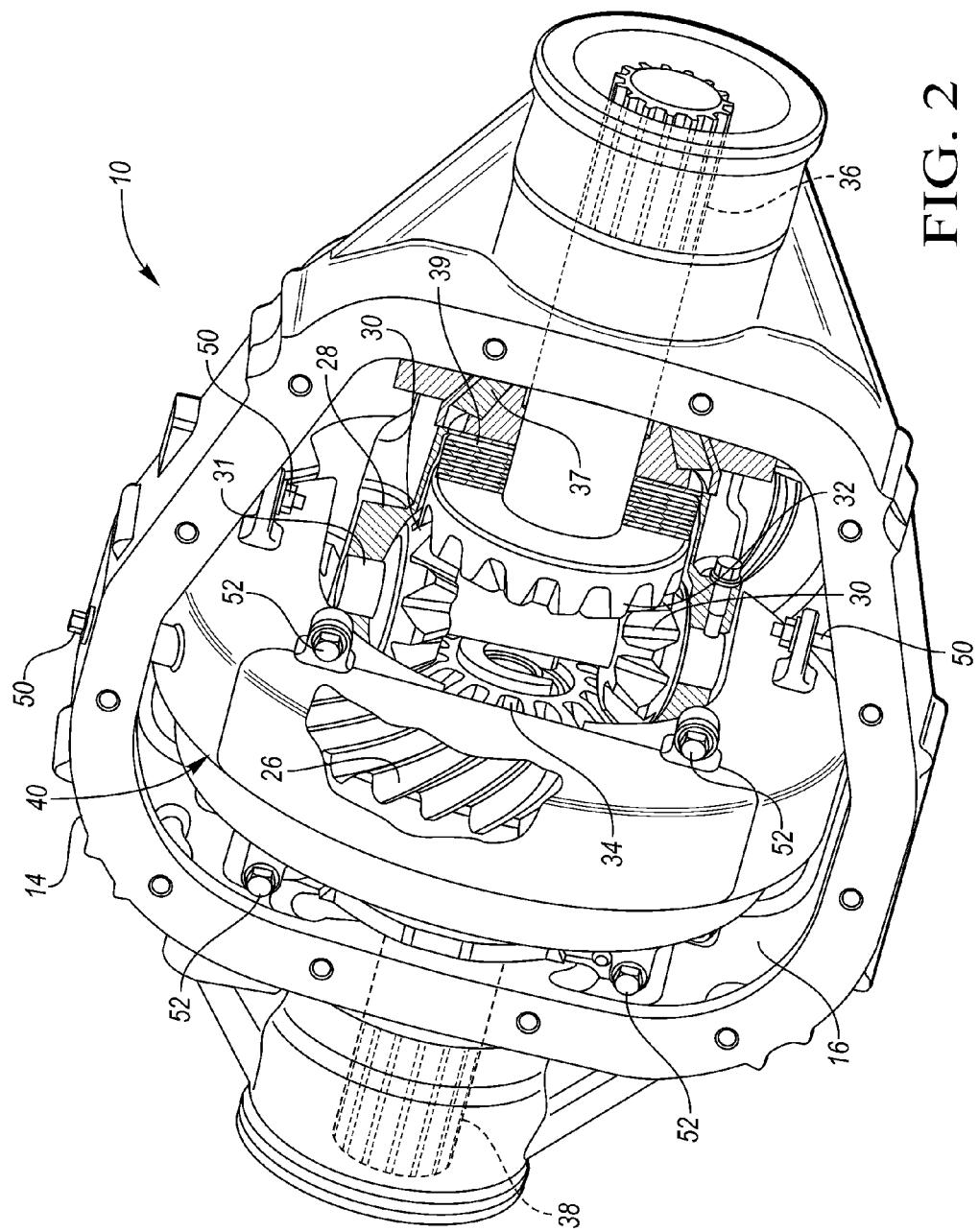
FIG. 2 is a rear view of a differential with the differential housing cover removed.

Referring to FIGS. 1 and 2, a differential 10 is illustrated. The differential 10 may be utilized in a vehicle such as an automobile, truck, farm equipment, or military transport vehicle. FIG. 1 is a cross-sectional side view of the differential 10 with the differential housing cover 12 removed. FIG. 2 is a rear view of the differential 10 with the differential housing cover 12 removed. For clarification purposes, some of the internal components of the differential 10 are shown as cross-sections in FIG. 2. The differential 10 includes a housing 14. The housing 14 includes a lower portion that may be referred to as a sump 16. Differential lubricating fluid (or lubricating fluid or oil) located within the housing 14 of the differential 10 may collect within the sump 16.

The differential 10 includes an input shaft 18. The input shaft 18 may be supported in the housing 14 by a first input bearing 20 and a second input bearing 22. The input shaft 18 may also be referred to as the driveshaft. The input shaft 18 may connect to a vehicle powertrain. The input shaft 18 may receive power from any conventional power source in a vehicle such as an internal combustion engine, electric machine (electric motor), fuel-cell, etc. The input shaft 18 may be connected to a manual or automatic transmission of a vehicle.

An input gear 24 may be connected to the input shaft 18. The input gear 24 may be a separate component that is secured to the input shaft 18 or may be an integral part of the input shaft 18. The input gear 24 may be configured to mesh with a ring gear 26. A carrier 28 may be affixed to the ring gear 26. At least one planet gear 30 may be rotatably secured to the carrier 28. The planet gears 30 may be rotatably secured to the carrier 28 by at least one pin 31. In the embodiment shown, two planet gears are depicted. However, it should be understood that the disclosure is meant to include carriers that have one or more planet gears rotatably affixed thereto. The planet gears 30 mesh with a first output gear 32 and a second output gear 34. The first output gear 32 may be connected to a first output shaft 36 (or half shaft). The first output gear 32 may be a separate component that is secured to the first output shaft 36 or may be an integral part of the first output shaft 36. The second output gear 34 may be connected to a second output shaft 38 (or half shaft). The second output gear 34 may be a separate component that is secured to the second output shaft 38 or may be an integral part of the second output shaft 38. The first output shaft 36 and second output shaft 38 may be rotatably connected to the drive wheels of a vehicle.

The first output shaft 36 and second output shaft 38 may each be supported in the differential housing 14 by output bearings 37. The first output shaft 36/first output gear 32 combination and the second output shaft 38/second output gear 34 combination may include clutch packs 39 that are configured to reduce or increase the torque flow and/or rotational speed of the respective output shafts, if the differential is a clutch pack type limited slip differential.

Although the planet gears 30, first output gear 32 and second output gear 34 are shown as bevel gears, other types of gears may be used. For example, in a Torsen® type differential, the planet gears comprise at least one set of two worm wheels that mesh with output gears that comprise worm gears. Also in a Torsen® type differential, the relative speeds of each set of worm wheels is synchronized in opposite directions with at least one set of two meshing spur gears where each of the spur gears in a set is coaxial with one of the worm wheels.

The ring gear 26 may be configured to transfer lubricating fluid out of the sump 16. The ring gear 26 transfers the lubricating fluid by splashing the lubricating fluid out of the sump 16 and onto the various moving components within the differential 10 that may require lubrication. A differential lubricating fluid diverter 40 (or diverter) may be included within the differential 10. The diverter 40 may be shaped to channel or direct the lubricating fluid to various components within the differential 10 that may require lubrication. For example, the diverter 40 may be configured to direct the lubricating fluid to the carrier 28, planet gears 30, first output gear 32, second output gear 34, input shaft 18, first input bearing 20, second input bearing 22, or input gear 24. In addition, the housing 14 may include various channels to direct the lubricating fluid to various components. For example, a channel 42 may be included in the housing 14 that is configured to direct lubricating fluid to the input shaft 18, first input bearing 20, and/or second input bearing 22.

The diverter 40 may include an upper portion 44, a middle portion 46, and a lower portion 48. The lower portion 48 of the diverter 40 may also be referred to as a cradle. The upper portion 44 and lower portion 48 may be secured to the housing 14 of the differential 10 by a first series of fasteners 50. The middle portion 46 may connect the upper portion 44 to the lower portion 48 by a second series of fasteners 52.

The lower portion 48 of the diverter may be located in the sump 16. The lubricating fluid located in the sump 16 may flow into the lower portion 48 of the diverter 40. The ring gear 26 may be configured to transfer the lubricating fluid out of the lower portion 48 of the diverter 40, and therefore also out of the sump 16. The upper portion 44, on the other hand, may be configured to direct the lubricating fluid transferred by the ring gear 26 to the carrier 28, planet gears 30, first output gear 32, second output gear 34, input shaft 18, first input bearing 20, second input bearing 22, or input gear 24. The lubricating fluid may be first removed from the lower portion 48 by the rotating ring gear 26 which splashes the lubricating fluid out of the lower portion 48. The diverter 40 may partially close off the ring gear 26 creating a channel that allows the lubricating fluid to flow from the lower portion 48 into to the middle portion 46 and upper portion 44. Once the lubricating fluid is in the upper portion 44, a portion of the lubricating fluid (which may have a higher velocity) may be directed toward the input shaft 18, first input bearing 20, and second input bearing 22, while another portion of the lubricating fluid (which may have a lower velocity) may be directed toward the carrier 28, planet gears 30, first output gear 32, and second output gear 34.

Figure 3:
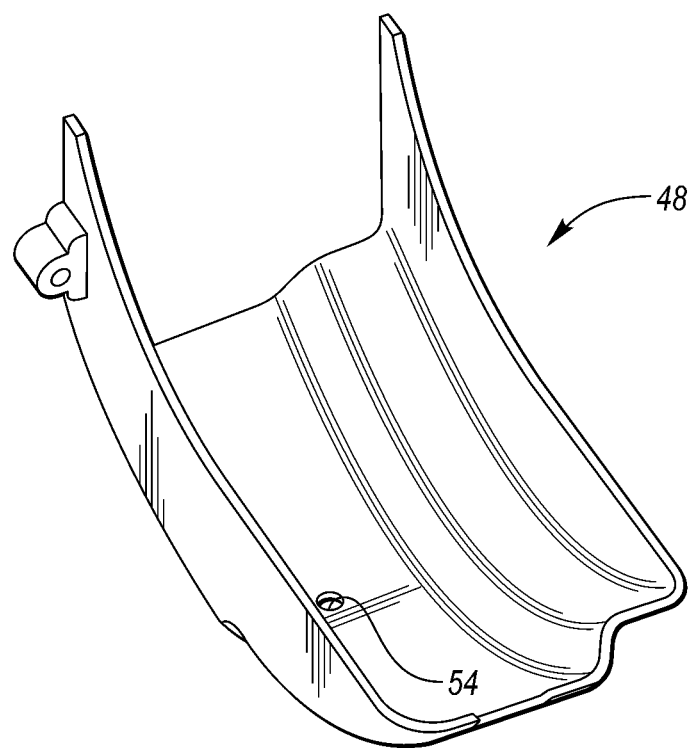
FIG. 3 is a top view of a lower portion of a differential lubricating fluid diverter.

Referring to FIG. 3, a top view of the lower portion 48 of the differential lubricating fluid diverter 40 is illustrated. The lower portion 48 of the diverter 40 may include a flow rate restricting orifice 54 (or orifice). The orifice 54 may be configured to restrict a rate at which the lubricating fluid flows into the lower portion 48 from the sump 16. Restricting the flow rate of the lubricating fluid from the sump 16 to the lower portion 48 may result in a lower fluid level in the lower portion 48 of the diverter 40 relative to the sump 16. An example of a lower fluid level in the lower portion 48 of the diverter 40 as compared to the fluid level in the sump 16 is illustrated in FIG. 1 by lines 56 and 58, with line 56 representing the higher fluid level in the sump 16 and line 58 representing the lower fluid level in the lower portion 48 of the diverter 40. Decreasing the lubrication fluid level in the lower portion 48 of the diverter 40 reduces the amount of lubrication fluid contacting the ring gear reducing the amount of parasitic drag on the rotation of the ring gear, which leads to a decrease in energy losses. If the differential 10 is being used in a vehicle, the decrease in energy losses will lead to an increase in fuel economy.

Figure 4:
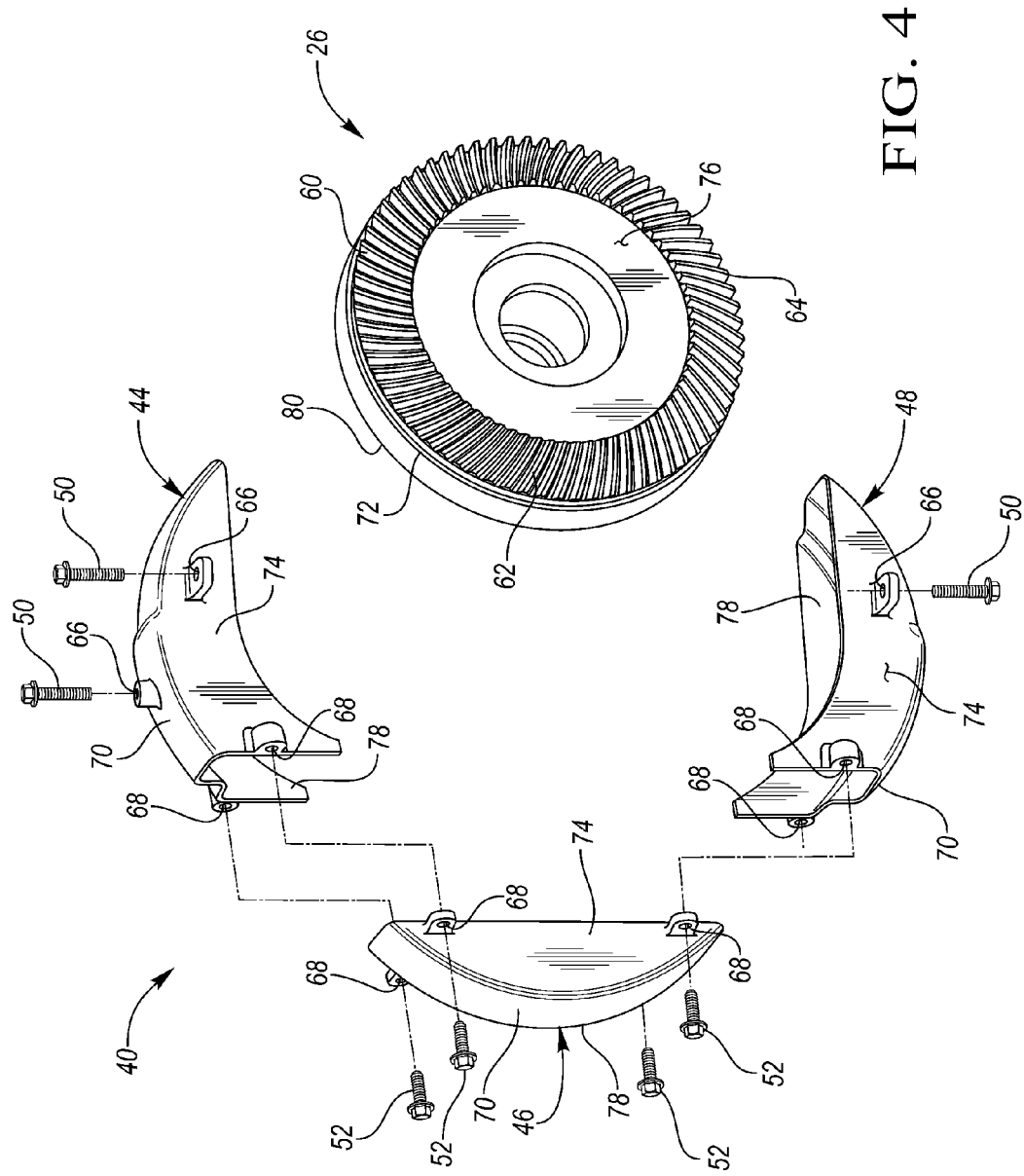
FIG. 4 is an exploded view of the differential lubricating fluid diverter shown relative to a ring gear.

Referring to FIG. 4, an exploded view of the differential lubricating fluid diverter 40 shown relative to the ring gear 26 is illustrated. The upper portion 44 of the diverter 40 may be configured to enclose a top portion 60 of the ring gear 26. The middle portion 46 of the diverter 40 may be configured to enclose a center portion 62 of the ring gear 26. The lower portion 48 of the diverter 40 may be configured to enclose a bottom portion 64 of the ring gear 26.

The diverter 40 may include a first series of mounting holes 66 (that may include brackets or flanges) that correspond to a mating set of holes on the housing 14. The first series of fasteners 50 may be utilized to secure the diverter to the housing 14 via the first set of mounting holes 66 and mating set of holes on the housing 14. Each mounting hole 66 and corresponding mating hole on the housing 14 may comprise a through hole and tapped hole pair. The diverter 40 may also include a second series of mounting holes 68 (that may include brackets or flanges). The second series of fasteners 52 may be utilized to secure the middle portion 46 of the diverter 40 to the upper portion 44 and lower portion 48 of the diverter 40. Each mounting hole 68 on the middle portion 46 of the diverter 40 may correspond to a mounting hole 68 located on either the upper portion 44 or lower portion 48 of the diverter 40. The corresponding mounting holes 68 on the middle portion 46 and upper portion 44 or lower portion 48 may comprise a through hole and tapped hole pair.

The diverter 40 may include an outer wall 70 that is configured for installation surrounding a portion of a periphery 72 of the ring gear 26. The outer wall 70 of the diverter 40 may be secured or fixed to the housing 14 of the differential 10. The diverter 40 may also include a first side wall 74 that extends from the outer wall 70 and is configured to enclose a portion of a first side 76 of the ring gear 26. The first side wall 74 of the diverter 40 may also be secured to the housing 14 of the differential 10. The diverter 40 may also include a second side wall 78 that extends from the outer wall 70 and is configured to enclose a portion of a second side 80 of the ring gear 26. The second side wall 78 of the diverter 40 may also be secured to the housing 14 of the differential 10.

The differential 10 is shown as a clutch pack type limited slip differential, although the differential may any type of differential including an open, limited slip, or locking type differential. If the differential is a limited slip type differential, it may be a clutch pack, Cone, plate, hydraulic locking, 2-way, 1-way, 1.5-way, or Torsen® type limited slip differential. Additionally, if the differential is a limited slip differential, it may be a fixed value, torque sensitive, speed sensitive, or electronically controlled differential.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A differential comprising:
   a housing including a sump;
   a ring gear having a carrier, a periphery, and an upper portion located on an opposite side of the ring gear relative to the sump; and
   a diverter having an outer wall extending about the periphery, terminating at a downward angle toward the sump along the upper portion, and first and second side walls extending from the outer wall, respectively enclosing opposite sides of the ring gear.

2. The differential of claim 1, further comprising an input shaft, wherein the input shaft is supported in the housing by a first input bearing and the diverter is configured to direct lubricating fluid to the first input bearing.

3. The differential of claim 2, wherein the input shaft is supported in the housing by a second input bearing and the diverter is configured to direct the lubricating fluid to the second input bearing.

4. The differential of claim 3, wherein the housing includes a channel configured to direct the lubricating fluid to the input shaft and the second bearing.

5. The differential of claim 2, wherein the input shaft includes an input gear that meshes with the ring gear and the diverter is configured to direct the lubricating fluid to the input gear.

6. The differential of claim 1, wherein at least one planet gear is rotatably secured to the carrier, the at least one planet gear meshes with a first output gear and a second output gear, and the diverter is configured to direct lubricating fluid to the at least one planet gear, first output gear, and second output gear.

7. The differential of claim 1, wherein the diverter includes a lower portion located in the sump, the lower portion of the diverter including a portion of the outer wall that terminates at an upward angle along a lower portion of the ring gear, wherein lubricating fluid flows from the sump to the lower portion and the ring gear is configured to transfer the lubricating fluid out of the lower portion.

8. The differential of claim 7, wherein the outer wall defines an orifice along the lower portion of the diverter non-adjacent to an edge corresponding to where the outer wall terminates at the upward angle, the orifice configured to restrict a rate at which the lubricating fluid flows into the lower portion from the sump.

9. A differential lubricating fluid diverter comprising:
   an outer wall adapted for fixation to a differential housing, the outer wall adapted for installation surrounding a portion of a periphery of a ring gear such that the outer wall terminates at a downward angle along an upper portion of the ring gear that is located on an opposite side the ring gear relative to a sump, rotation of the ring gear transfers lubricating fluid out of the sump, and the diverter directs the lubricating fluid transferred by the ring gear to a carrier that is affixed to the ring gear;
   a first side wall extending from the outer wall and enclosing a portion of a first side of the ring gear; and
   a second side wall extending from the outer wall and enclosing a portion of a second side of the ring gear.

10. The differential lubricating fluid diverter of claim 9, wherein the diverter includes a lower portion located in the sump, the lower portion including a portion of the outer wall that terminates at an upward angle along a lower portion of the ring gear, wherein the lubricating fluid flows from the sump to the lower portion and the ring gear is configured to transfer the lubricating fluid out of the lower portion.

11. The differential lubricating fluid diverter of claim 10, wherein the outer wall defines an orifice along the lower portion of the diverter non-adjacent to an edge corresponding to where the outer wall terminates at the upward angle, the orifice configured to restrict a rate at which the lubricating fluid flows into the lower portion from the sump.

12. The differential lubricating fluid diverter of claim 9 further configured, to direct the lubricating fluid to an input bearing supporting an input shaft in the housing.

13. The differential lubricating fluid diverter of claim 9, wherein at least one planet gear is rotatably secured to the carrier, the at least one planet gear meshes with a first output gear and a second output gear, and the diverter is configured to direct the lubricating fluid to the at least one planet gear, first output gear, and second output gear.

14. A differential lubricating fluid diverter comprising:
   an upper portion enclosing and terminating at a downward angle along an upper portion of a ring gear located on an opposite side of the ring gear relative to a sump;
   a lower portion enclosing and terminating at an upward angle along a lower portion of the ring gear, wherein lubricating fluid flows from the sump to the lower portion of the diverter through a flow rate restricting orifice that is defined in an outer wall of the lower portion of the diverter prior to an edge of the outer wall corresponding to where the lower portion of the diverter terminates at the upward angle, the ring gear transfers the lubricating fluid out of the lower portion of the diverter, and the upper portion of the diverter directs the lubricating fluid transferred by the ring gear to an input shaft and a carrier that is affixed to the ring gear;
a first side wall extending from the outer wall and enclosing a portion of a first side of the ring gear; and
a second side wall extending from the outer wall and enclosing a portion of a second side of the ring gear.

15. The differential lubricating fluid diverter of claim 14, wherein the upper portion of the diverter and the lower portion of the diverter are secured to a differential housing.

16. The differential lubricating fluid diverter of claim 15, wherein a middle portion of the diverter encloses a center portion of the ring gear and connects the upper portion of the diverter to the lower portion of the diverter.

17. The differential lubricating fluid diverter of claim 14, wherein at least one planet gear is rotatably secured to the carrier, the at least one planet gear meshes with a first output gear and a second output gear, and the diverter is configured to direct the lubricating fluid to the at least one planet gear, first output gear, and second output gear.

18. The differential lubricating fluid diverter of claim 14, wherein the input shaft is supported in a differential housing by an input bearing and the diverter is configured to direct the lubricating fluid to the input bearing.

* * * * *